(12) United States Patent
Koskinen et al.

(10) Patent No.: US 6,325,985 B1
(45) Date of Patent: Dec. 4, 2001

(54) METHOD AND APPARATUS FOR REDUCING NOX EMISSIONS IN CFB REACTORS USED FOR COMBUSTION OF FUEL CONTAINING LARGE AMOUNTS OF VOLATILE COMBUSTIBLE COMPONENTS

(75) Inventors: Jari Koskinen, Joensuu; Harri Vilokki, Kyminlinna, both of (FI)

(73) Assignee: Foster Wheeler Energia Oy, Helsinki (FI)

( * ) Notice: Subject to any disclaimer, the term of this patent is extended or adjusted under 35 U.S.C. 154(b) by 0 days.

(21) Appl. No.: 09/508,285

(22) PCT Filed: Sep. 15, 1998

(86) PCT No.: PCT/FI98/00726

§ 371 Date: Mar. 9, 2000

§ 102(e) Date: Mar. 9, 2000

(87) PCT Pub. No.: WO99/14531

PCT Pub. Date: Mar. 25, 1999

(30) Foreign Application Priority Data

Sep. 16, 1997 (FI) .......................................... 973696

(51) Int. Cl.⁷ ............................. B01D 53/54; B01D 53/60

(52) U.S. Cl. ........................ 423/239.1; 422/168; 422/172; 422/173

(58) Field of Search ............................... 423/235, 239.1; 422/168, 172, 173

(56) References Cited

U.S. PATENT DOCUMENTS

| | | | |
|---|---|---|---|
| 3,900,554 | 8/1975 | Lyon | 423/235 |
| 4,181,705 | 1/1980 | Gumerman | 423/235 |

(List continued on next page.)

FOREIGN PATENT DOCUMENTS

| | | |
|---|---|---|
| 0 690 266 | 1/1996 | (EP) . |
| 9-89213 | 4/1997 | (JP) . |
| WO 91/07219 | 5/1991 | (WO) . |
| WO 95/27554 | 10/1995 | (WO) . |

OTHER PUBLICATIONS

Mjörnell, et al., "Emissions From a Circulating Fluidized Bed Boiler II", Rapportserie A., Institutionen för Energitekník, Chalmers Tekniska Högskola, Aug. 1989.

Mjörnell, et al., "Emission Control With Additives in CFB Coal Combustion", 11ᵗʰ Int. Conf. on Fluidized Bed Combustion, Montreal, Apr. 1991.

(List continued on next page.)

*Primary Examiner*—Steven P. Griffin
*Assistant Examiner*—Maribel Medina
(74) *Attorney, Agent, or Firm*—Fitzpatrick, Cella, Harper & Scinto

(57) ABSTRACT

A method and an apparatus for reducing NOx emissions in CFB reactors used for combusting fuel at atmospheric pressure. The CFB reactor includes a combustion chamber having a fluidized bed of particles therein, a particle separator section including one or more consecutive particle separators, a convection section and a clean gas duct connecting the particle separator to the convection section. The apparatus also includes a device for injecting ammonia or its precursor into the flue gases, for reducing NOx therein. The ammonia or its precursor is injected into the clean gas duct connecting the last separator to the convection section, the clean gas duct having a very small density of solid particles herein. The temperature in the clean gas duct is sufficient for NOx reducing reactions.

26 Claims, 1 Drawing Sheet

U.S. PATENT DOCUMENTS

| | | | |
|---|---|---|---|
| 4,648,331 | 3/1987 | Thelen | 110/342 |
| 4,756,890 | 7/1988 | Tang et al. | 423/235 |
| 5,407,649 | 4/1995 | Andersson et al. | 431/7 |
| 5,462,718 | 10/1995 | Abdulally | 422/171 |
| 5,538,704 | 7/1996 | Pham et al. | 423/235 |

OTHER PUBLICATIONS

Leckner, et al., "The Influence of Additives of Selective Non–Catalytic Reduction of NO with $NH_3$ in Circulating Fluidized Bed Boilers", Finnish and Swedish Flame Days, Åbo, Sep. 1990.

Jahkola, et al., "Clean Energy for the World", 1991 International Conference on Fluidized Bed Combustion, vol. 2, Advanced Energy Systems Division, ASME, Montreal, Canada, Apr. 21–24, 1991, pp. 725–730.

Leckner, et al., "Influence of Additives on Selective Non-catalytic Reduction of NO with $NH_3$ in Circulating Fluidized Bed Boilers", reprinted from I&EC Research, 1991, 30.

"Steam Its Generation and Use", copyright© 1992 by The Babcock & Wilcox Company, a McDermott company, $40^{th}$ Edition, first printing, p. 34–4.

METHOD AND APPARATUS FOR REDUCING NOX EMISSIONS IN CFB REACTORS USED FOR COMBUSTION OF FUEL CONTAINING LARGE AMOUNTS OF VOLATILE COMBUSTIBLE COMPONENTS

BACKGROUND OF THE INVENTION

1. Field of the Invention

The present invention relates to a method and an apparatus for reducing NOx emissions in CFB reactors used for combustion of fuel at atmospheric pressure.

2. Description of the Related Art

Typically, CFB reactors, circulating fluidized bed reactors, include a combustion chamber, a particle separator section with one or more particle separators and a convection section. A fast fluidized bed of particles is maintained in the combustion chamber, whereby flue gases and solid particles entrained therein are discharged from the upper part of the combustion chamber, the flue gases thereby being introduced into a first particle separator, which is typically a cyclone separator, in the particle separator section. There may be more than one particle separator arranged in the particle separator section between the combustion chamber and the convection section. Cleaned flue gases are discharged from the last particle separator in the particle separator section into a clean gas duct which connects the convection section to the last particle separator. Cooling surfaces are disposed in a cooling stage in the convection section.

In a typical CFB combustion process fuel, such as biofuel or brown coal, is introduced into the combustion chamber and burned at atmospheric pressure and at 700–1000° C. Gases generated in the combustion process and solid bed particles are transported as a fast fluidized bed into the upper part of the combustion chamber and discharged therefrom into a particle separator section. Solid particles are separated from the flue gases in the particle separator section and at least partly returned to the combustion chamber through a return duct. The cleaned flue gases are discharged from the last particle separator into the clean gas duct and transported therethrough to the convection section, where the cleaned flue gases are cooled in a cooling stage.

An ongoing concern is the reduction of nitrogen oxide (NOx) emissions from the exhaust or flue gases before they are released into the atmosphere, since the NOx emissions are related to various environmental problems. It is evident that nitrogen oxide emissions result from any combustion reaction where air is present and/or the fuel used contains nitrogen. Nitrogen oxides are generated during combustion of fuels as a result of thermal fixation of nitrogen in the air and the conversion of fuel nitrogen. The former reaction is favored at high temperatures (above about 950° C.) while the latter is of greater concern at lower temperatures, e.g., those generally found in fluidized bed combustion systems and which actually have been found to be beneficial in reducing nitrogen oxide emissions.

It is generally known that introduction of a reducing agent, such as ammonia or an ammonia precursor, into the flue gases may be used for reduction of nitrogen oxide (NOx) levels in flue gases.

Different solutions in this respect for reducing nitrogen oxides in flue gases from conventional furnaces, as well as, fluidized bed combustors have been suggested. U.S. Pat. No. 3,900,554 suggests removal of nitrogen oxides from flue gases which have exited a conventional furnace, by injecting ammonia ($NH_3$) into the effluent stream. In order to provide favorable conditions for reducing $NO_x$ emissions in circulating fluidized bed boilers (CFB), several locations for ammonia injection have been suggested. U.S. Pat. Nos. 4,181,705 and 4,648,331 suggest injection of ammonia into the furnace, U.S. Pat. Nos. 5,462,718 and 5,538,704 suggest injection into the conduit between the furnace and a particle separator, and U.S. Pat. No. 4,756,890 and international publication WO91/07219 suggest injection into the particle separator.

U.S. Pat. No. 5,407,649, relating to a pressurized combustion process, discloses injecting ammonia or another nitrogen containing substance through a large number of nozzles into the flue gas flow at a particular location, where the flue gas flow still contains enough particles to build up a layer of solid particles on a filter surface arranged downstream of a first particle separator. It is suggested to inject ammonia immediately after a first coarse particle separation stage, at a location which ensures a long enough dwelling time for the flue gas and ammonia mixture before it reaches the filter surface and a final fine separation stage. The presented system requires a large number of injection nozzles, which may be located in a region extending from the freeboard in the furnace to the filter. The system functions well at high pressures, but at atmospheric pressure and at a temperature of about 800° C. it gives only a slight NOx conversion rate and below 800° C. it may even give a negative result, due to NOx being formed of $NH_3$.

In the Proceedings, pages 725–730, of the Fluidized Bed Combustion Conference, ASME 1991, the effectiveness of different ammonia injection locations is compared. In measurements made at the top of the combustion chamber, the freeboard was found to provide the optimum position for injecting ammonia under different operating conditions and for different types of fuels. Also, the outlet of the first coarse particle separating cyclone was tested as an ammonia injection location, but it seemed to lead to somewhat higher NOx emissions than when injecting ammonia into the top of the freeboard.

Contrary to the findings of the last mentioned study, it has now been noticed that the optimum location for ammonia injection varies depending on such factors as the load conditions of the boiler and the fuel type. In many combustion processes, the use of some of the locations suggested in previous patent publications and the above study leads to a satisfactory NOx reduction. However, in highest load conditions, or when using fuel including a large amount of volatile components, such as biofuel or brown coal, the NOx reducing schemes described above do not seem to operate as required. For such situations, new schemes for feeding NOx reducing agent are required.

Many of the presently used schemes for injecting NOx reducing agent are such that a large number of feeding points are required to provide sufficient distribution of the reducing agent. The feeding nozzles as such may, however, cause various problems, as nozzles are prone to erosion and blocking caused by solid material in the flue gas stream, and may, therefore, not function as required. Also, when assembling the nozzles within a centrifugal separator, the mounting may require separate additional constructions within the separator, which constructions may easily hinder the gas flow and thus degrade the separation efficiency of the separator.

BRIEF SUMMARY OF THE INVENTION

It is thereby an object of the present invention to provide a novel method and apparatus in which the aforementioned problems of earlier known methods and apparatuses are minimized.

It is particularly an object of the present invention to provide for combustion processes using circulating fluidized bed boilers at atmospheric pressure an improved method and an improved apparatus for reducing nitrogen oxide emissions into the atmosphere.

It is also an object of the present invention to provide an improved method and apparatus in which some of the aforementioned problems are overcome by providing a rapid and efficient mixing of NOx reducing agent into flue gases.

It is further an object of the present invention to provide a method and an apparatus which provide an efficient NOx reduction in flue gases in combustion processes using bioftiels, brown coal and other similar fuels containing large amounts of volatile components.

It is also an object of the present invention to provide a novel method and apparatus which provide an efficient NOx reduction particularly in high load conditions.

A still further object of the present invention is to provide for combustion processes using circulating fluidized bed boilers a simple and enduring method and apparatus for reducing nitrogen oxide emissions into the atmosphere, which method and apparatus do not degrade the separation efficiency of the particle separator.

These and other objects of the present invention are accomplished by providing a method and an apparatus for reducing NOx emissions in circulating fluidized bed (CFB) reactors, used for combusting fuel at atmospheric pressure, as claimed in the appended claims.

According to the present invention, NOx-emissions are reduced in CFB combustion processes by injecting ammonia or its precursor into the cleaned flue gases preferably in a clean gas duct connected directly to the gas outlet of the last particle separator prior to the convection section. Ammonia or its precursor is preferably injected into the immediate first part of the clean gas duct, typically, the vortex finder connecting the clean gas duct to the separator. The reducing agent may, however, if desired be injected further downstream into the clean gas duct, as long as a sufficient dwelling time for the ammonia/flue gas mixture is ensured at a high enough temperature optimal for NOx reduction in each particular condition, i.e., before the mixture reaches the cooling stage of the convection section.

In a CFB reactor according to the present invention, there are provided means for injecting ammonia or its precursor at an injection point preferably immediately at the beginning of a clean gas duct connected to the outlet of the last particle separator in a group of consecutive particle separators arranged between the CFB combustion chamber and its convection section. The NOx reducing agent is according to the present invention preferably fed into the gas flow in a duct which is dimensioned to allow a sufficient dwelling time, at least 0.1 second, typically 0.4–1 second, for the flue gases between the feeding point and the cooling surfaces in the cooling section in the convection section or gas back pass. This condition is to provide a sufficient retention time for the ammonia in conditions which are favorable for nitrogen oxide reduction. However, the injection means may, if desired, be provided in the gas flow downstream of said clean gas duct at a point which ensures the above mentioned dwelling time for the ammonia/flue gas mixture at a temperature optimal for the NOx reduction.

The clean gas duct as such may further, according to a preferred embodiment of the present invention, be formed to include in the clean gas duct a constriction having a smaller diameter or cross-sectional area than the diameter or cross section of the main part of said clean gas duct. The constriction ensures that a good mixing of reducing agent with flue gases can be achieved, when injecting reducing agent at this constriction or close thereto, even if only one or a few, typically 1–3, injection nozzles are used. In a narrow portion of the clean gas duct, the whole flue gas flow can easily be contacted with the reducing agent and the reducing agent sprays do not have to cover a wide region, as is the case when injecting reducing agent into the furnace itself, into a particle separator or in front of a filter.

The vortex finder at the outlet of a cyclone separator typically forms a constriction in the gas flow path. The vortex finder forms a first narrow part of the clean gas duct. The cross-sectional area $A_1$ of a vertical vortex finder, connected to the outlet of the last separator, may be less than ⅓ of the cross-sectional area $A_2$ of the latter horizontal main part of the clean gas duct, which latter portion connects the clean gas duct to the convection section. $A_1$ is typically about 0.5–2 $m^2$, whereas $A_2$ is 1.5–6 $m^2$.

According to the present invention, ammonia or its precursor is injected into high temperature flue gases which, contrary to earlier techniques, already have been cleaned, i.e., flue gases which without further cleaning can be forwarded to the convection section. Such clean flue gases typically contain less than 50 $g/m^3$ solid particles, in many processes <10 $g/m^3$. The effect of the reducing agent is thereby improved, as the amount of solid particles, which could prevent ammonia injection from reaching deep into the gas flow, is very small.

The injection nozzles may, according to the present invention, be directed in the clean gas duct so as to inject the reducing agent perpendicularly against the gas flow. The injection nozzles may preferably be located at the periphery of the clean gas duct and arranged to inject reducing agent in a direction extending radially from the periphery toward the center of the gas flow. The reducing agent may then be sprayed in an expanding fan-like form, thus covering the main cross-sectional area of the clean gas duct. Nozzles arranged at the periphery of the clean gas duct may more easily be protected from erosion and accumulation of solids than nozzles located in the middle of the gas flow. In earlier techniques, when using conventional reducing agent injection locations, where a significant concentration of entrained particles is present, the direction of injection is preferably parallel with the gas flow in order to avoid erosion and blocking of the nozzles. However, by such a direction of injection, the distribution of the agent into the gases is not very effective.

Contrary to the teachings of the prior art, it has now been found that in highest load conditions, or when using fuels including large amount of volatile components, such as biofuel or brown coal, feeding of NOx reducing agent immediately downstream of the outlet of a last cyclone separator, which is the last separator before the convection section, leads to the best NOx reduction. As an example ammonia injected into a side wall of a cyclone separator provided a 46% NOx reduction whereas in the same conditions ammonia injected into the clean gas duct immediately downstream of the last cyclone separator resulted in a 56% reduction.

Thus, a significant 10% improvement was obtained by ammonia injection into the clean gas duct. Corresponding improvements have been observed in other operating conditions also.

An explanation for this surprising result may be afterburning taking place in the cyclones. The conventional ammonia feeding points within cyclone separators are, if afterburning leading to high temperatures takes place, located too early in the process to function properly. In conventional processes, ammonia may be fed into the flue gases at too high temperatures and at a location after which nitrogen oxides still are produced. In such high temperature conditions, ammonia may also actually produce nitrogen oxides instead of reducing them. Afterburning does not take place in the clean gas duct, which therefore allows safe injection of ammonia.

Another explanation for the poor NOx reduction, when injecting ammonia into the separator, may be that, when injecting ammonia at conventional injection points, i.e., in the freeboard of the furnace, in the conduit between the furnace and the separator and within the separator, the solids entrained in the flue gas hinder the mixing of the ammonia with the flue gas, or influence negatively the reaction of ammonia with nitrogen oxides. When $NH_3$ is injected into a region where CaO and $O_2$ are present, $NH_3$ may also be converted into nitrogen oxides. In the clean gas duct after the separator, the solids concentration is, even for highest circulation rates and in high load conditions, very low. Therefore, high load conditions do not have a similar negative effect on NOx reduction, as they have when injecting reducing agent directly into the furnace or a separator.

The present invention provides extremely good mixing of reducing agent and flue gases which, when a certain level of NOx reduction is required, leads to a lower ammonia consumption and thereby to lower costs and lower ammonia slip into the environment compared to the conventional ammonia injection schemes.

A further advantage of injecting NOx reducing agent into a clean gas duct after a separator is that injection nozzles and their feeding pipes can easily be connected to the reactor at this location, without the need of separate support structures. The injection nozzles may easily be fixed to the separator or the support structures of the clean gas duct. By locating the injection nozzles downstream of the separator, it is ensured that the injection system does not have a negative effect on the particle separation, i.e., does not degrade the performance of the separator.

BRIEF DESCRIPTION OF THE DRAWINGS

In the following, one exemplary embodiment of the invention is now described in more detail with reference to the enclosed drawings, in which FIG. 1 schematically shows an exemplary embodiment of a CFB boiler system utilizing the present invention

DETAILED DESCRIPTION OF THE INVENTION

Figure 1:
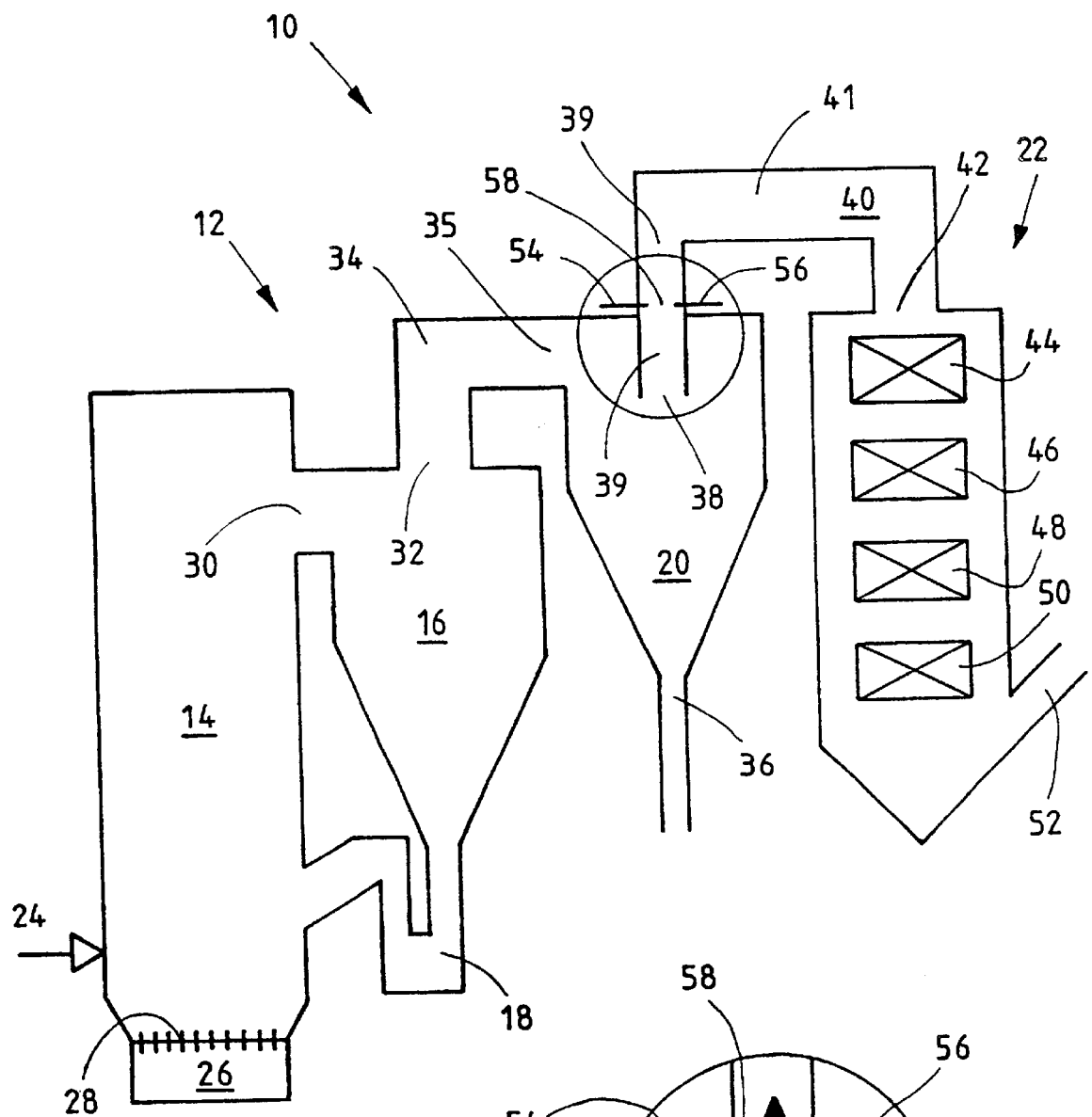

FIG. 1 shows a CFB boiler system 10, including a CFB reactor 12, with a combustion chamber 14, a first coarse particle separator 16 and a return duct 18. The system further includes a second fine particle separator 20 and a convection section 22.

Fuel, including large amounts of volatile components, such as biofuel or brown coal, is introduced through an inlet 24 into a furnace or combustion chamber 14. A fluidized bed of hot solid particles is maintained in the combustion chamber 14. Fluidization and combustion air is introduced from an air plenum 26 through a grid 28 into the combustion chamber 14, so that a fast fluidized bed is maintained in the furnace. Flue gases with solid particles entrained therein are discharged through an outlet opening 30 from the furnace 14 into the first particle separator 16. The outlet openings 30 form an inlet into the first separator 16.

Coarse solid particles are separated from the flue gases in the separator 16 and returned through a solids outlet 17 and return duct 18 into the furnace 14. Partially cleaned gases are discharged through an outlet 32 into a duct 34 and introduced therefrom through an inlet 35 into the second fine particle separator 20. Fine solid particles are separated from the flue gas in the second separator 20 and discharged through an outlet 36. The separated fine particles may be returned to the furnace or be discharged from the system.

Gases cleaned in the second separator 20, so that they include <50 $g/m^3$ solid particles, preferably <10 $g/m^3$ or even <5 $g/m^3$ are discharged through an outlet 38 into a clean gas duct 40. The first vertical part of the clean gas duct forms a vortex finder 39 partly protruding into the separator 20. The cross section of the vortex finder is much smaller than the cross section of the rest, mainly horizontal, part 41 of the clean gas duct 40. The cross-sectional area $A_1$ of the vortex finder 39 may be only one tenth or less of the cross-sectional area $A_2$ of the main part 41 of the clean gas duct 40. The vortex finder typically has a circular cross section, whereas the main part of the clean gas duct 40 has a rectangular cross section.

The clean gas duct 40 connects an inlet 42 of the convection section 22 to the fine particle separator 20. Several cooling stages 44, 46, 48 and 50 are arranged in the convection section. The cleaned gases are arranged to pass the cooling stages in consecutive order from the first cooling stage 44 to the last 50 and to be discharged from the convection section 22 through an outlet 52. Ammonia or other NOx reducing agent is injected into the cleaned flue gases in the clean gas duct 40 through two injection nozzles 54 and 56 at an injection point 58, immediately above the last separator 20. The nozzles may be supported by the top of the separator 20.

There is a gas flow passage between the injection point 58 and the first cooling stage 44 which is long enough to provide the necessary dwelling time for the mixture of flue gas and reducing agent at a temperature favorable for NOx reduction, before the mixture is cooled at the first cooling stage 44 in the convection section 22.

Figure 2:
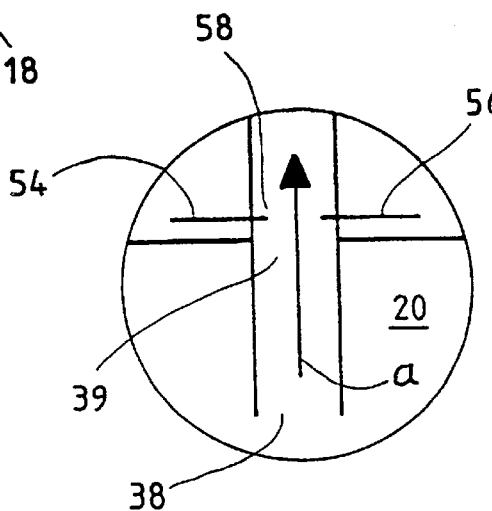
FIG. 2 shows an enlargement of the reducing agent injection point shown in FIG. 1.

FIG. 2 shows an enlargement of the vortex finder 39 at the injection point 58 with a flue gas flow direction a. The reducing agent is preferably injected from the periphery radially inward towards the center of the vortex finder. The injection may in a cross-sectional plane of the gas duct have the form of a fan, i.e., the injection expanding to cover an as large area of the cross section as possible.

Of course, the reducing agent may, if desired, be injected downwardly from the injection point along a path forming an angle <90° with the axis of the flow direction. Perpendicular or countercurrent injection of reducing agent improves the mixing of reducing agent with flue gas. In order to achieve countercurrent flow of reducing agent and cleaned flue gas, injection nozzles may be disposed in the ceiling of the first part of the horizontal clean gas duct 41 axially above the vortex finder 39. If mixing is believed to take place very easily, then also co-current injection of reducing agent may be used.

Generally the vortex finder 39 is a mainly vertical cylindrical tube small enough to allow reducing agent to be injected from the nozzles 54, 56 deep into the clean gas flow and thereby be efficiently mixed with the flue gas. If desired, further injection points may be arranged in, e.g., the horizontal portion of the clean gas duct 40, as long as a sufficient dwelling time at a high enough temperature is provided for the flue gas and reducing agent mixture.

The vortex finder is a simple constricted part of the clean gas duct. If necessary, further obstacles may be provided within the clean gas duct on the walls thereof to form a very short constricted portion for injecting reducing agent therefrom and thus improving the mixing of reducing agent and gas.

It has now been realized that NOx reduction without catalyst can still take place in the clean gas duct, when good mixing of reducing agent and clean gas is provided and a sufficient dwelling time for the mixture at a high enough, but not too high, temperature is ensured.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

One preferred embodiment of the present invention including two particle separators has been shown. In other embodiments of the present invention, only one or more than two separators may be included. The two or more separators may be arranged one after the other in the flow direction of the flue gas. Often, two or more parallel separators may be connected to one large combustion chamber. The present invention is intended to include also these embodiments.

Thereby, it should be understood that any known nitrogen reducing agent may be utilized in connection with the present invention, but preferably, the reducing agent is selected from the group essentially consisting of amine-containing agents, ammonia, urea or an ammonia producing precursor.

It should also be understood that the invention may be applied to methods and apparatuses for lowering nitrogen oxide contents in flue gases emanating from the reactions of substantially any combustible fuel including solid fuels, sludges, gaseous fuels or the like.

We claim:

1. A method for reducing NOx emissions in circulating fluidized bed reactors used for combustion of fuel containing large amounts of volatile combustible components, at atmospheric pressure, the circulating fluidized bed reactor including a combustion chamber, having a fluidized bed of particles therein, a particle separator section connected to a flue gas outlet in the combustion chamber and including at least one consecutive particle separator, connected one after the other and each particle separator having an inlet for flue gases and an outlet for cleaned flue gases, a clean gas duct connected to the cleaned flue gas outlet of the last particle separator in the particle separator section, and a convection section connected to the clean gas duct, the convection section having a cleaned flue gas inlet connected to the clean gas duct, for connecting the convection section to the last particle separator, cooling surfaces arranged in a cooling stage in the convection section, and an outlet for cooled flue gases, the method including the following consecutive steps:

introducing fuel into the combustion chamber;

combusting the fuel at 700 to 1000° C. and transporting gases generated during the combustion process and solid particles as a fast fluidized bed into the upper part of the combustion chamber;

discharging flue gases, which contain solid particles, from the combustion chamber into the particle separator section;

separating solid particles from the flue gases in the particle separator section;

introducing cleaned flue gases from the last particle separator into the clean gas duct;

transporting cleaned flue gases through the clean gas duct into the cooling stage of the convection section;

cooling the flue gases in the cooling stage;

discharging cooled flue gases through the cooled flue gas outlet from the convection section: and injecting ammonia or its precursor into the flue gases, for reducing NOx therein, wherein the ammonia or its precursor is injected (i) at an injection point into the cleaned flue gases in the clean gas duct connected to the cleaned flue gas outlet of the last particle separator, and (ii) into a constricted portion of the clean gas duct, in which constricted portion, the cross-sectional area $A_1$ of the duct is one third of the mean cross-sectional area $A_2$ of the duct.

2. A method according to claim 1, further comprising injecting ammonia or its precursor into the first portion of the clean gas duct.

3. A method according to claim 1, wherein, in a circulating fluidized bed reactor which includes in the last particle separator a vortex finder forming a first portion of the clean gas duct, further comprising injecting ammonia or its precursor into the vortex finder portion of the clean gas duct.

4. A method according to claim 1, wherein after the injection of ammonia or its precursor, a dwelling time of 0.1 to 1 second is ensured for the cleaned flue gases in a gas passage between the injection point and the cooling stage of the convection section.

5. A method according to claim 4, wherein a dwelling time of 0.4 to 1 second is ensured.

6. A method according to claim 1, further comprising injecting the ammonia or its precursor into the cleaned gas at a temperature interval of about 700 to 1000° C., wherein the temperature of the cleaned gas after introduction of ammonia or its precursor is kept for 0.1 to 1 second at a temperature greater than 700° C.

7. A method according to claim 6, wherein the temperature of the cleaned gas after introduction of ammonia or its precursor is kept for 0.4 to 1 second.

8. A method according to claim 1, further comprising introducing from the last particle separator into the clean gas duct cleaned flue gases including less than 50 g/m$^3$ solid particles therein.

9. A method according to claim 8, further comprising introducing from the last particle separator into the clean gas duct cleaned flue gases including less than 10 g/m$^3$ solid particles therein.

10. A method according to claim 1, further comprising injecting the ammonia or its precursor into the cleaned flue gases through one to three separate injection nozzles.

11. A method according to claim 1, further comprising injecting the ammonia or its precursor radially into the clean gas duct.

12. A method according to claim 11, wherein the injection radially into the clean gas duct is mainly perpendicular to the gas flow circulation.

13. A method according to claim 1, wherein the consecutive particle separators are cyclone separators.

14. An apparatus for reducing NOx emissions in circulating fluidized bed reactors used for combustion of fuel containing large amounts of volatile combustible components at atmospheric pressure, the circulating fluidized bed reactor comprising:

a combustion chamber having a fast fluidized bed of particles therein;

a particle separator section connected to a flue gas outlet in said combustion chamber and at least one consecutive particle separators connected to each other one after the other, and each particle separator having an inlet for flue gases and an outlet for cleaned flue gases;

a clean gas duct connected to the cleaned flue gas outlet of the last particle separator in the particle separator section;

a convection section connected to said clean gas duct, said convection section having a cleaned flue gas inlet connected to said clean gas duct, for connecting said convection section to said last particle separator;

cooling surfaces arranged in a cooling stage in said convection section;

an outlet for cooled flue gases;

means for injecting ammonia or its precursor into the flue gases, for reducing NOx therein, wherein said means for injecting ammonia or its precursor is provided (i) at an injection point in the clean gas duct connected to said clean flue gas outlet of the last particle separator and (ii) in a constricted portion of said clean gas duct, in which constricted portion the cross-sectional area $A_1$ of the clean gas duct is one third of the mean cross-sectional $A_2$ of the clean gas duct.

15. An apparatus according to claim 14, wherein the injection point for injecting ammonia or its precursor is arranged in a vertical first part of the clean gas duct immediately above the last particle separator.

16. An apparatus according to claim 14, wherein the injection point for injecting ammonia or its precursor is arranged in a vortex finder connected to the flue gas outlet of the last particle separator, the vortex finder forming a first portion of the clean gas duct.

17. An apparatus according to claim 14, further comprising a passage between the injection point of ammonia or its precursor in said clean gas duct and the cooling stage in said convection section, which passage ensures a dwelling time of 0.1 to 1 second for the cleaned flue gases at a temperature of greater than 700° C.

18. An apparatus according to claim 17, wherein a dwelling time of 0.4 to 1 second is assured.

19. An apparatus according to claim 14, wherein the last particle separator has a cleaning efficiency providing flue gases including less than 50 $g/m^3$ solid particles therein.

20. An apparatus according to claim 19, wherein the cleaning efficiency provides flue gases including less than 10 $g/m^3$ solid particles therein.

21. An apparatus according to claim 14, wherein one to three nozzles for injecting ammonia or its precursor are provided at the injection point.

22. An apparatus according to claim 14, wherein a nozzle for injecting ammonia or its precursor is arranged at the injection point so as to inject ammonia or its precursor radially into the clean gas duct.

23. An apparatus according to claim 22, wherein the injection radially into the clean gas duct is mainly perpendicular to the gas flow direction.

24. An apparatus according to claim 14, wherein the last particle separator is a cyclone separator.

25. An apparatus according to claim 14, wherein said clean gas duct at the injection point has a cross-sectional area of about 0.5 to 2 $m^2$.

26. An apparatus according to claim 14, wherein said consecutive cyclone separators are cyclone separators.

* * * * *